(12) United States Patent
Liu et al.

(10) Patent No.: US 11,115,515 B2
(45) Date of Patent: Sep. 7, 2021

(54) METHOD FOR PLAYING SOUND AND MULTI-SCREEN TERMINAL

(71) Applicant: XI'AN ZHONGXING NEW SOFTWARE CO. LTD, Shaanxi (CN)

(72) Inventors: Fengpeng Liu, Shaanxi (CN); Dongmei Liu, Shaanxi (CN)

(73) Assignee: XI'AN ZHONGXING NEW SOFTWARE CO. LTD, Xi'an (CN)

( * ) Notice: Subject to any disclaimer, the term of this patent is extended or adjusted under 35 U.S.C. 154(b) by 0 days.

(21) Appl. No.: 16/633,195

(22) PCT Filed: Oct. 12, 2017

(86) PCT No.: PCT/CN2017/105869
§ 371 (c)(1),
(2) Date: Jan. 23, 2020

(87) PCT Pub. No.: WO2019/019420
PCT Pub. Date: Jan. 31, 2019

(65) Prior Publication Data
US 2020/0153952 A1    May 14, 2020

(30) Foreign Application Priority Data
Jul. 25, 2017   (CN) .......................... 201710612875.0

(51) Int. Cl.
*H04M 1/03*   (2006.01)
*G06F 1/16*   (2006.01)
(Continued)

(52) U.S. Cl.
CPC .......... *H04M 1/035* (2013.01); *G06F 1/1647* (2013.01); *H04M 1/021* (2013.01); *H04R 1/025* (2013.01); *H04M 2250/16* (2013.01)

(58) Field of Classification Search
CPC ........ H04M 1/02; H04M 1/035; H04M 1/725; H04M 1/021; H04M 2250/16;
(Continued)

(56) References Cited

U.S. PATENT DOCUMENTS 6,445,574 B1   9/2002   Saw et al.
8,384,615 B2   2/2013   Tan et al.
(Continued)

FOREIGN PATENT DOCUMENTS

CN   102035910 A   4/2011
CN   102236690 A   11/2011
(Continued)

OTHER PUBLICATIONS

European Patent Office. Search Opinion for EP application No. 17919373.5, dated Mar. 9, 2021, pp. 1-5.
(Continued)

*Primary Examiner* — Mohammed Rachedine (57) ABSTRACT

Disclosed are a method for playing sound and a multi-screen terminal. The method includes: detecting, by a multi-screen terminal, a current opening/closing angle or angles between the respective display screens; and selecting, by the multi-screen terminal according to the detected current opening/closing angle or angles, a group of prestored audio drive parameters, and outputting the group of audio drive parameters to a power amplification module of the multi-screen terminal; or, determining whether the current opening/closing angle or angles and the current audio drive parameters are respectively prestored opening/closing angle or angles and audio drive parameters corresponding to an optimal sound field playing effect, and if not, giving a prompt as to whether to adjust the opening/closing angle or angles between the respective display screens and/or the current audio drive parameters.

9 Claims, 4 Drawing Sheets

---

Detect, by a multi-screen terminal, a current opening/closing angle or angles between the respective display screens — 101

Select, by the multi-screen terminal according to the detected current opening/closing angle or angles, a group of prestored audio drive parameters, and outputs the group of audio drive parameters to a power amplification module of the multi-screen terminal; or, determine whether the detected current opening/closing angle or angles and the current audio drive parameters are prestored opening/closing angle or angles and audio drive parameters corresponding to an optimal sound field playing effect, respectively, and if not, give a prompt as to whether the current opening/closing angle or angles and/or the current audio drive parameters need to be adjusted — 102

(51) Int. Cl.
*H04M 1/02* (2006.01)
*H04R 1/02* (2006.01)
*H04M 1/72442* (2021.01)

(58) Field of Classification Search
CPC ..... H04R 1/025; G06F 1/1618; G06F 1/1647; G06F 1/1681
See application file for complete search history.

(56) References Cited

U.S. PATENT DOCUMENTS

| | | | |
|---|---|---|---|
| 10,050,456 B2 * | 8/2018 | Flynn | H02J 7/0045 |
| 10,198,450 B2 * | 2/2019 | Reeves | G06F 1/1647 |
| 2009/0324002 A1 | 12/2009 | Richardson | |
| 2011/0242361 A1 * | 10/2011 | Kuwahara | H04N 5/2252 |
| | | | 348/231.4 |
| 2012/0280924 A1 | 11/2012 | Kummer et al. | |
| 2014/0101576 A1 * | 4/2014 | Kwak | G06F 1/1643 |
| | | | 715/761 |
| 2014/0157125 A1 * | 6/2014 | Seo | G06F 3/165 |
| | | | 715/716 |
| 2017/0295269 A1 * | 10/2017 | Hosoi | H04M 1/02 |
| 2017/0332171 A1 * | 11/2017 | Kim | G10K 11/17853 |
| 2018/0356904 A1 * | 12/2018 | Disano | G06F 3/1423 |
| 2019/0278323 A1 * | 9/2019 | Aurongzeb | G06F 1/1643 |
| 2019/0394563 A1 * | 12/2019 | Kim | H04R 1/02 |
| 2020/0164270 A1 * | 5/2020 | Lin | H04S 7/303 |

FOREIGN PATENT DOCUMENTS

| | | | | |
|---|---|---|---|---|
| CN | 102340585 A | 2/2012 | | |
| CN | 102497480 A | 6/2012 | | |
| CN | 102857628 A | 1/2013 | | |
| CN | 103051794 A | 4/2013 | | |
| CN | 103620967 A | 3/2014 | | |
| CN | 104360797 A | 2/2015 | | |
| CN | 106131322 A | 11/2016 | | |
| CN | 106293596 A | 1/2017 | | |
| CN | 106507251 A * | 3/2017 | ............ | H04S 7/302 |
| CN | 106791031 A | 5/2017 | | |
| CN | 108933978 A | 12/2018 | | |
| CN | 206251225 | 12/2018 | | |
| EP | 2738640 A2 | 6/2014 | | |
| JP | H11275686 A | 10/1999 | | |
| JP | 2001310280 A | 11/2001 | | |
| JP | 2006157857 A | 6/2006 | | |
| JP | 2006174133 A | 6/2006 | | |
| JP | 2007158638 A | 6/2007 | | |
| JP | 201468288 A | 4/2014 | | |
| JP | 2014110049 A | 6/2014 | | |
| KR | 1020150087530 A | 7/2015 | | |
| TW | 200847731 A | 12/2008 | | |
| WO | WO-2010028397 A1 * | 3/2010 | ........... | G06F 1/1684 |

OTHER PUBLICATIONS

European Patent Office. Supplementary European Search Report for EP application No. 17919373, dated Mar. 9, 2021, pp. 1-2.
Japanese Patent Office. Notice of Reasons for Refusal and translation for JP application No. 2020-503859, dated Mar. 23, 2021, pp. 1-4.
Japanese Patent Office. Search Report and translation for JP 2020-503859, dated Feb. 26, 2021, pp. 1-39.
WIPO, International Search Report dated Mar. 26, 2018.
CN Extended Search Report and Office Action dated Sep. 18, 2020, CN Application No. 2017106128750 (dated Jul. 25, 2017).

* cited by examiner

METHOD FOR PLAYING SOUND AND MULTI-SCREEN TERMINAL

CROSS-REFERENCE TO RELATED APPLICATIONS

This is a National Phase Application filed under 35 U.S.C. 371 as a national stage of PCT/CN2017/105869, filed on Oct. 12, 2017, an application claiming the priority of Chinese Patent Application No 201710612875.0, filed on Jul. 25, 2017, the contents of which are incorporated herein in their entirety by reference.

TECHNICAL FIELD

The present disclosure relates to the field of communication technologies, and particularly relates to a method for playing sound and a multi-screen terminal.

BACKGROUND

The smart terminals have increasingly higher requirements for sound effects, and the auditory experience of a user is required to be improved as much as possible either in a voice call scenario or a multimedia playing scenario. The existing smart terminals typically use more excellent electroacoustic convertors, integrate a more complicated audio post-processing algorithm in a multimedia playing scenario, and use an audio optimization algorithm in a voice call scenario. The audio post-processing algorithm and the audio optimization algorithm can provide functions such as noise suppression, sound effect enhancement, echo cancellation, voice enhancement and the like, and thus optimize the audio effect of the smart terminal, and improve the auditory experience of the user.

With the rapid development of smart terminals, more and more smart terminals have multiple display screens. When a smart terminal with multiple display screens is used for application display, each of the display screens may display different parts of the same content, or may display different contents. For example, with the existing dual-screen mobile terminal (such as a dual-screen mobile phone), a user can independently operate two display screens. That is, the two screens may be used for watching television, listening to music, surfing the internet and the like, respectively and dependently, so that one smart terminal has multiple functions at the same time. However, when the two display screens are playing sound data simultaneously, loudspeakers on the two display screens have a problem of sound field cancellation, resulting in poor user experience.

SUMMARY

In order to solve the above technical problem, the present disclosure provides a method for playing sound and a multi-screen terminal, which can solve the problem of sound field cancellation of multiple loudspeakers of a multi-screen terminal.

To achieve the objects of the present disclosure, the technical solutions in the embodiments of the present disclosure are implemented as follows:

In an embodiment of the present disclosure, there is provided a method for playing sound, including:

detecting, by a multi-screen terminal, a current opening/closing angle or angles between the respective display screens; and selecting, by the multi-screen terminal according to the detected current opening/closing angle or angles between the respective display screens, a group of prestored audio drive parameters, and outputting the group of audio drive parameters to a power amplification module of the multi-screen terminal; or, determining whether the detected current opening/closing angle or angles between the respective display screens and the current audio drive parameters are prestored opening/closing angle or angles and audio drive parameters corresponding to an optimal sound field playing effect, respectively, and if not, giving a prompt as to whether the current opening/closing angle or angles between the respective display screens and/or the current audio drive parameters need to be adjusted.

Optionally, the step of selecting, by the multi-screen terminal according to the detected current opening/closing angle or angles between the respective display screens, a group of prestored audio drive parameters, and outputting the group of audio drive parameters to the power amplification module of the multi-screen terminal specifically includes:

selecting, by the multi-screen terminal, prestored audio drive parameters corresponding to the detected current opening/closing angle or angles between the respective display screens, and outputting the selected audio drive parameters to the power amplification module; or, calculating, by the multi-screen terminal, similarity between the detected current opening/closing angle or angles between the respective display screens and prestored opening/closing angles between the respective display screens, and selecting the audio drive parameters corresponding to a prestored opening/closing angle or angles with the maximum similarity with the current opening/closing angle or angles, and outputting the audio drive parameters to the power amplification module.

Optionally, assuming that the prestored opening/closing angles between the respective display screens are arrays A1 to An, where n is the number of sets of correspondence relationships among the prestored opening/closing angles between the respective display screens and the sound field playing effects, and the detected current opening/closing angle or angles between the respective display screens form an array B, the step of calculating, by the multi-screen terminal, similarity between the detected current opening/closing angle or angles between the respective display screens and prestored opening/closing angles between the respective display screens specifically includes:

calculating differences between corresponding array elements in the array B and in each of the arrays A1-An and variance and/or weighted average of each group of differences; wherein the smaller the calculated variance and/or weighted average of the differences between the array elements in the array B and the array elements in an array Ai, the greater the similarity between the array B and the array Ai, where i is a natural number between 0 and n-1.

Optionally, the method further includes:

adjusting by the multi-screen terminal, in case where the current opening/closing angle or angles between the respective display screens and/or the current audio drive parameters need to be adjusted, the current opening/closing angle or angles between the respective display screens and/or the current audio drive parameters to the prestored opening/closing angle or angles and/or audio drive parameters corresponding to the optimal sound field playing effect; or, giving, on a currently used display screen through a user interface, a prompt as to how to adjust the current opening/closing angle or angles between the respective display screens and/or the current audio drive parameters to the prestored opening/closing angle or angles and/or audio drive parameters corresponding to the optimal sound field playing effect.

Optionally, the audio drive parameters include a filter parameter, a gain parameter and a phase parameter.

In an embodiment the present disclosure, there is further provided a method for playing sound, including:

detecting, by a multi-screen terminal, a current opening/closing angle or angles between the respective display screens; and selecting, according to the detected current opening/closing angle or angles between the respective display screens and a current sound field type, a group of prestored audio drive parameters, and outputting the group of audio drive parameters to a power amplification module of the multi-screen terminal; or, determining whether the detected current opening/closing angle or angles between the respective display screens, the current audio drive parameters, and the current sound field type are prestored opening/closing angle or angles, audio drive parameters and sound field type corresponding to an optimal sound field playing effect, respectively, and if not, giving a prompt as to whether the current opening/closing angle or angles between the respective display screens, the current audio drive parameters and/or the current sound field type need to be adjusted.

In an embodiment the present disclosure, there is further provided a multi-screen terminal, including a detecting module, a processing module, a power amplification module and a storage module, wherein:

the detecting module is configured to detect a current opening/closing angle or angles between the respective display screens, and output the detected current opening/closing angle or angles between the respective display screens to the processing module;

the processing module is configured to select, according to the detected current opening/closing angle or angles between the respective display screens, a group of audio drive parameters prestored in the storage module, and output the group of audio drive parameters to the power amplification module; or, determine whether the detected current opening/closing angle or angles between the respective display screens and the current audio drive parameters are opening/closing angle or angles and audio drive parameters prestored in the storage module corresponding to an optimal sound field playing effect, respectively, and if not, give a prompt as to whether the current opening/closing angle or angles between the respective display screens and/or the current audio drive parameters need to be adjusted;

the power amplification module is configured to output an audio according to the audio drive parameters; and the storage module is configured to prestore at least one set of correspondence relationships among the opening/closing angles between the respective display screens, the sound field playing effects and the audio drive parameters.

Optionally, the multi-screen terminal further includes an adjusting module, wherein:

the processing module is further configured to send a notification to the adjusting module in case where the current opening/closing angle or angles between the respective display screens and/or the current audio drive parameters need to be adjusted; and the adjusting module is configured to adjust, after receiving the notification from the processing module, the current opening/closing angle or angles between the respective display screens and/or the current audio drive parameters to the prestored opening/closing angle or angles and/or audio drive parameters corresponding to the optimal sound field playing effect; or give, on a currently used display screen through a user interface, a prompt as to how to adjust the current opening/closing angle or angles between the respective display screens and/or the current audio drive parameters to the prestored opening/closing angle or angles and/or audio drive parameters corresponding to the optimal sound field playing effect.

Optionally, the processing module selecting, according to the detected current opening/closing angle or angles between the respective display screens, a group of audio drive parameters prestored in the storage module, and outputting the group of audio drive parameters to the power amplification module includes:

selecting audio drive parameters prestored in the storage module corresponding to the detected current opening/closing angle or angles between the respective display screens, and outputting the selected audio drive parameters to the power amplification module; or, calculating similarity between the detected current opening/closing angle or angles between the respective display screens and the opening/closing angles between the respective display screens prestored in the storage module, and selecting the audio drive parameters corresponding to a prestored opening/closing angle or angles with the maximum similarity with the current opening/closing angle or angles, and outputting the audio drive parameters to the power amplification module.

Optionally, assuming that the prestored opening/closing angles between the respective display screens are arrays $A1$ to $An$, where n is the number of sets of correspondence relationships among the prestored opening/closing angles between the respective display screens and the sound field playing effects, the detected current opening/closing angle or angles between the respective display screens form an array B, and the processing module calculating similarity between the detected current opening/closing angle or angles between the respective display screens and the opening/closing angles between the respective display screens prestored in the storage module includes:

calculating differences between corresponding array elements in the array B and in each of the arrays $A1$-$An$ and variance and/or weighted average of each group of differences; wherein the smaller the variance and/or weighted average calculated from the array B and an array $Ai$, the greater the similarity of the array B and the array $Ai$, where i is a natural number between 1 and n.

Optionally, the audio drive parameters include a filter parameter, a gain parameter and a phase parameter.

Optionally, the detecting module includes a mechanical goniometer, a magnetic goniometer or a laser goniometer.

Optionally, the processing module is specifically configured to select, according to the detected current opening/closing angle or angles between the respective display screens and a current sound field type, a group of audio drive parameters prestored in the storage module, and output the group of audio drive parameters to the power amplification module; or, determine whether the current opening/closing angle or angles between the respective display screens, the current audio drive parameters, and the current sound field type are an opening/closing angle or angles, audio drive parameters and sound field type prestored in the storage module corresponding to an optimal sound field playing effect, respectively, and if not, give a prompt as to whether the current opening/closing angle or angles between the respective display screens, the current audio drive parameters and/or the current sound field type need to be adjusted.

The technical solution of the present disclosure has the following beneficial effects:

According to the method for playing sound and the multi-screen terminal of the present disclosure, by means of prestoring correspondence relationships among the opening/closing angles, the audio drive parameters and the sound field playing effects, the problem of sound field cancellation of multiple loudspeakers of a multi-screen terminal is solved, the audio effect of the multi-screen terminal is optimized, and the auditory experience of a user is thus improved.

BRIEF DESCRIPTION OF THE DRAWINGS

The drawings described herein are intended to provide a further understanding of the present disclosure, and are intended to be a part of the present disclosure. The exemplary embodiments of the present disclosure and the description thereof are for explaining the present disclosure and do not constitute an undue limitation of the present disclosure. In the drawings.

DETAILED DESCRIPTION

For clarity and better understanding of objects, technical solutions and advantages of the present disclosure, embodiments of the present disclosure will now be described in detail with reference to the accompanying drawings. It should be noted that the embodiments of the present disclosure and features therein may be combined with each other in any manner as long as they are not contradictory.

Figure 1:
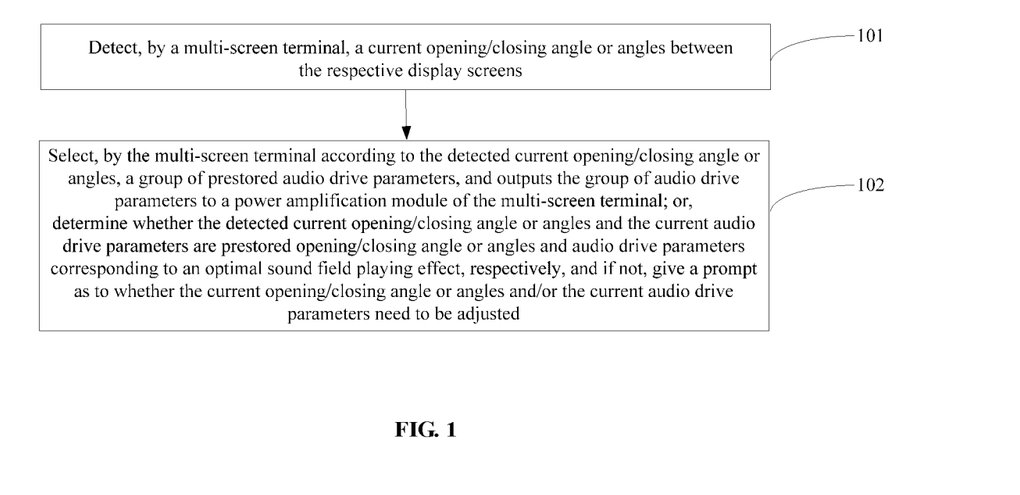
FIG. 1 is a schematic flowchart illustrating a method for playing sound according to an embodiment of the present disclosure.

As shown in FIG. 1, a method for playing sound according to the present disclosure includes the following steps 101 to 102.

At step 101, a multi-screen terminal detects a current opening/closing angle or angles between the respective display screens.

Optionally, the multi-screen terminal detects the current opening/closing angle or angles between the respective (adjacent) display screens (of the multi-screen terminal) through an angle detecting device.

It should be noted that the angle detecting device of the present disclosure may adopt an existing angle measuring instrument such as a mechanical goniometer, a magnetic goniometer or a laser goniometer. When a mechanical goniometer is used for detection, a mechanical angle detecting element is provided on a rotation shaft of the multi-screen terminal. Each time the multi-screen terminal rotates for an angle, its mechanical structure rotates accordingly, and the mechanical angle detecting element transmits different signals to mark different rotation angles. When a magnetic goniometer is used for detection, a magnetic detecting element (such as a Hall device) is arranged on a rotation shaft of the multi-screen terminal. Each time the multi-screen terminal rotates for an angle, the magnetic detecting element detects a different change in field intensity, and thus measures and calculates different rotation angles. When a laser goniometer is used for detection, a laser ranging element is provided on a rotation shaft of the multi-screen terminal. Each time the multi-screen terminal rotates for an angle, its mechanical structure rotates accordingly, and the distance between the opening-closing parts of the multi-screen terminal also changes accordingly. Then, the laser ranging element measures the distance and in turn calculates the different rotation angles.

At step 102, the multi-screen terminal selects, according to the detected current opening/closing angle or angles between the respective display screens, a group of prestored audio drive parameters, and outputs the group of audio drive parameters to a power amplification module of the multi-screen terminal; or, the multi-screen terminal determines whether the detected current opening/closing angle or angles between the respective display screens and the current audio drive parameters are prestored opening/closing angle or angles and audio drive parameters (together) corresponding to an optimal sound field playing effect, respectively, and if not, gives a prompt as to whether the current opening/closing angle or angles between the respective display screens and/or the current audio drive parameters need to be adjusted (to be the prestored opening/closing angle or angles and/or audio drive parameters corresponding to the optimal sound field playing effect).

Specifically, the audio drive parameters include, but are not limited to, a filter parameter, a gain parameter and a phase parameter. The filter parameter is used for frequency-selection of different frequencies of sound signals for further processing (e.g., amplification, attenuation, rejection, etc.). The gain parameter is used for amplification or attenuation of the frequency-selected sound signals, and generally speaking, different gain parameters are adopted for sound signals of different frequency points. The phase parameter is used for phase shift processing of the sound signals to produce a stereo reverberation effect of the whole sound field so that the sound field could show more space sense and image sense.

It should be noted that the sound field in the present disclosure refers to a space occupied by an elastic medium in which sound waves are present. The medium may be a gas, a liquid or a solid, and the medium involved in environmental acoustics is mainly atmosphere. The sound field may be further classified into free field and reverberant field, diffuse sound field, and so on.

The prestored correspondence relationships among the opening/closing angles, the audio drive parameters, and the sound field playing effects may be set before the multi-screen terminal leaves the factory. For example, by debugging and recording different sound field playing effects corresponding to different opening/closing angles and different audio drive parameters, several different opening/closing angles and audio drive parameters capable of obtaining the optimal sound field playing effect at each of the several opening/closing angles are selected as the prestored correspondence relationships among the opening/closing angles, the sound field playing effects, and the audio drive parameters.

Optionally, the step of selecting, by the multi-screen terminal according to the detected current opening/closing angle or angles between the respective display screens, a group of prestored audio drive parameters, and outputting the group of audio drive parameters to the power amplification module of the multi-screen terminal specifically includes:

selecting, by the multi-screen terminal, prestored audio drive parameters corresponding to the detected current opening/closing angle or angles between the respective display screens, and outputting the selected audio drive parameters to the power amplification module of the multi-screen terminal; or, calculating, by the multi-screen terminal, similarity between the detected current opening/closing angle or angles between the respective display screens and prestored opening/closing angles (prestored sets of opening/closing angle or angles) between the respective display screens, and selecting the audio drive parameters corresponding to a prestored opening/closing angle or angles with the maximum similarity with the current opening/closing angle or angles, and outputting the selected audio drive parameters to the power amplification module of the multi-screen terminal.

Optionally, assuming that the prestored opening/closing angles between the respective display screens are arrays $A_1$ to $A_n$, where n is the number of sets of correspondence relationships among the prestored opening/closing angles between the respective display screens and the sound field playing effects, and the detected current opening/closing angle or angles between the respective display screens form an array B, the step of calculating, by the multi-screen terminal, similarity between the detected current opening/closing angle or angles between the respective display screens and the prestored opening/closing angles between the respective display screens specifically includes:

calculating differences between corresponding array elements in the array B and in each of the arrays $A_1$-$A_n$ and calculating variance and/or weighted average of each group of differences; wherein the smaller the calculated variance and/or weighted average of the differences between the array elements in the array B and the array elements in an array $A_i$, the greater the similarity between the array B and the array $A_i$, where i is a natural number between 1 and n.

It should be noted that when calculating the variance and/or weighted average of each group of differences, weights of the respective elements in each array of elements are set in advance in the multi-screen terminal according to actual conditions, and when the weights of the respective elements are the same, the weighted average is the average; the smaller the obtained variance and/or weighted average, the greater the similarity.

In an embodiment of the present disclosure, assuming that the multi-screen terminal is a three-screen terminal, and the array $A_i$ includes two array elements ($a_{i0}$, $a_{i1}$), where $a_{i0}$ is an included angle between a first screen and a second screen, and $a_{i1}$ is an included angle between the second screen and a third screen, where i is a natural number between 1 and n. Assuming that five sets of correspondence relationships between the opening/closing angles between the respective display screens and sound field playing effects are prestored, in which an array $A_1$ of the opening/closing angles between the respective display screens is [90°, 90°], $A_2$ is [30°, 90°], $A_3$ is [90°, 30°], $A_4$ is [60°, 30°], and $A_5$ is [45°, 45°]. Assuming that the detected current opening/closing angles between the respective display screens (i.e., between the first and second screen, and between the second and third screen) form an array B, which is [85°, 95°], then:

firstly, the differences between corresponding array elements in the array B and the arrays $A_1$ to $A_5$ are respectively calculated, i.e., [−5°, 5°], [55°, 5°], [−5°, 60°], [25°, 45°] and [40°, 50°];

next, the average and variance of each group of differences are calculated, i.e., the first group of differences has an average $((-5)+5)/2=0$, and a variance $((-5-0)^2+(5-0)^2)/2=25$; the second group of differences has an average $(55+5)/2=30$, and a variance $((55-30)^2+(5-30)^2)/2=625$; the third group of differences has an average $((-5)+60)/2=27.5$, and a variance $((-5-27.5)^2+(60-27.5)^2)/2=1056.25$; the fourth group of differences has an average $(25+45)/2=35$, and a variance $((25-35)^2+(45-35)^2)/2=100$; the fifth group of differences has an average $(40+50)/2=45$, and a variance $((40-45)^2+(50-45)^2)/2=25$. It can be seen from the calculation results that the first group of differences has the minimum average, and the first and fifth groups of differences have the minimum variance. Therefore, the current opening/closing angles between the respective display screens are considered to be most similar to the first group of prestored opening/closing angles between the respective display screens, and thus the audio drive parameters corresponding to the first group of opening/closing angles are output to the power amplification module of the multi-screen terminal.

In an embodiment of the present disclosure, if the current opening/closing angle or angles between the respective display screens and/or the current audio drive parameters need to be adjusted, the multi-screen terminal adjusts the current opening/closing angle or angles between the respective display screens and/or the current audio drive parameters to the prestored opening/closing angle or angles and/or audio drive parameters corresponding to the optimal sound field playing effect; or, gives (shows) on a currently used display screen through a user interface, a prompt as to how to adjust the current opening/closing angle or angles between the respective display screens and/or the current audio drive parameters to the prestored opening/closing angle or angles and/or audio drive parameters corresponding to the optimal sound field playing effect.

Optionally, the present disclosure provides a method for playing sound, including the following steps:

detecting, by a multi-screen terminal, a current opening/closing angle or angles between the respective display screens; and selecting, according to the detected current opening/closing angle or angles between the respective display screens and a current sound field type, a group of prestored audio drive parameters, and outputting the group of audio drive parameters to a power amplification module of the multi-screen terminal; or, determining whether the detected current opening/closing angle or angles between the respective display screens, the current audio drive parameters, and the current sound field type are prestored opening/closing angle or angles, audio drive parameters and sound field type corresponding to an optimal sound field playing effect, respectively, and if not, giving a prompt as to whether the current opening/closing angle or angles between the respective display screens, the current audio drive parameters and/or the current sound field type need to be adjusted.

Optionally, if the current opening/closing angle or angles between the respective display screens, the current audio drive parameters and/or the current sound field type need to be adjusted, the multi-screen terminal adjusts the current opening/closing angle or angles between the respective display screens, the current audio drive parameters and/or the current sound field type to the prestored opening/closing angle or angles, audio drive parameters and/or sound field type corresponding to the optimal sound field playing effect, or gives on a currently used display screen through a user interface, a prompt as to how to adjust the current opening/closing angle or angles between the respective display screens, the current audio drive parameters and/or the current sound field type to the prestored opening/closing angle or angles, audio drive parameters and/or sound field type corresponding to the optimal sound field playing effect.

For example, the sound field type may include various types such as soft, clear, heavy bass, and rock style. At this time, among the prestored correspondence relationships among the opening/closing angles, the sound field types, and the sound field playing effects, the same opening/closing angle(s) corresponds to multiple sets of audio drive parameters for obtaining a better sound field playing effect for different sound field types.

Figure 2:
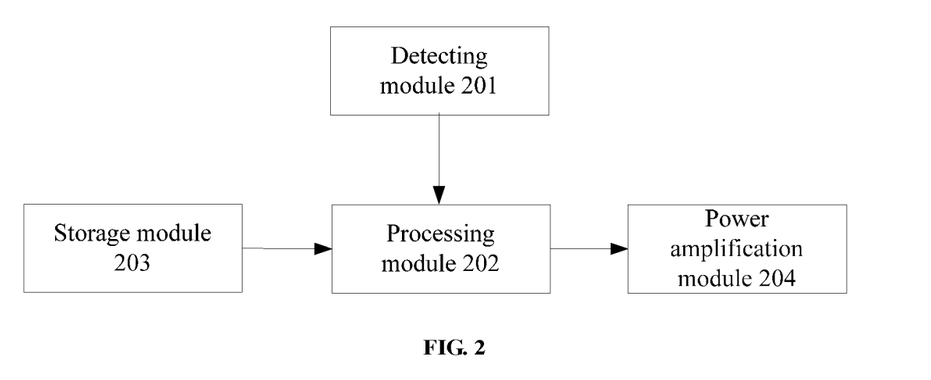
FIG. 2 is a schematic structural diagram of a multi-screen terminal according to a first embodiment of the present disclosure.

As shown in FIG. 2, a multi-screen terminal according to the present disclosure includes a detecting module 201, a processing module 202, a storage module 203 and a power amplification module 204, wherein:

the detecting module 201 is configured to detect opening/closing angle or angles between the respective display screens, and output the detected current opening/closing angle or angles between the respective display screens to the processing module 202;

the processing module 202 is configured to select, according to the detected current opening/closing angle or angles between the respective display screens, a group of audio drive parameters prestored in the storage module 203, and output the group of audio drive parameters to the power amplification module 204; or, determine whether the current opening/closing angle or angles between the respective display screens and the current audio drive parameters are opening/closing angle or angles and audio drive parameters prestored in the storage module 203 corresponding to an optimal sound field playing effect, respectively, and if not, give a prompt as to whether the current opening/closing angle or angles between the respective display screens and/or the current audio drive parameters need to be adjusted;

the storage module 203 is configured to prestore at least one set of correspondence relationships among the opening/closing angles between the respective display screens, the sound field playing effects and the audio drive parameters; and the power amplification module 204 is configured to output an audio according to the audio drive parameters.

It should be noted that the detecting module 201 of the present disclosure may adopt an existing angle measuring instrument such as a mechanical goniometer, a magnetic goniometer or a laser goniometer. When a mechanical goniometer is used for detection, a mechanical angle detecting element is provided on a rotation shaft of the multi-screen terminal. Each time the multi-screen terminal rotates for an angle, its mechanical structure rotates accordingly, and the mechanical angle detecting element transmits different signals to mark different rotation angles. When a magnetic goniometer is used for detection, a magnetic detecting element (such as a Hall device) is arranged on a rotation shaft of the multi-screen terminal. Each time the multi-screen terminal rotates for an angle, the magnetic detecting element detects a different change in field intensity, and thus measures and calculates different rotation angles. When a laser goniometer is used for detection, a laser ranging element is provided on a rotation shaft of the multi-screen terminal. Each time the multi-screen terminal rotates for an angle, its mechanical structure rotates accordingly, and the distance between the opening-closing parts of the multi-screen terminal also changes along. Then, the laser ranging element measures and calculates the distance and thus different rotation angles.

Figure 3:
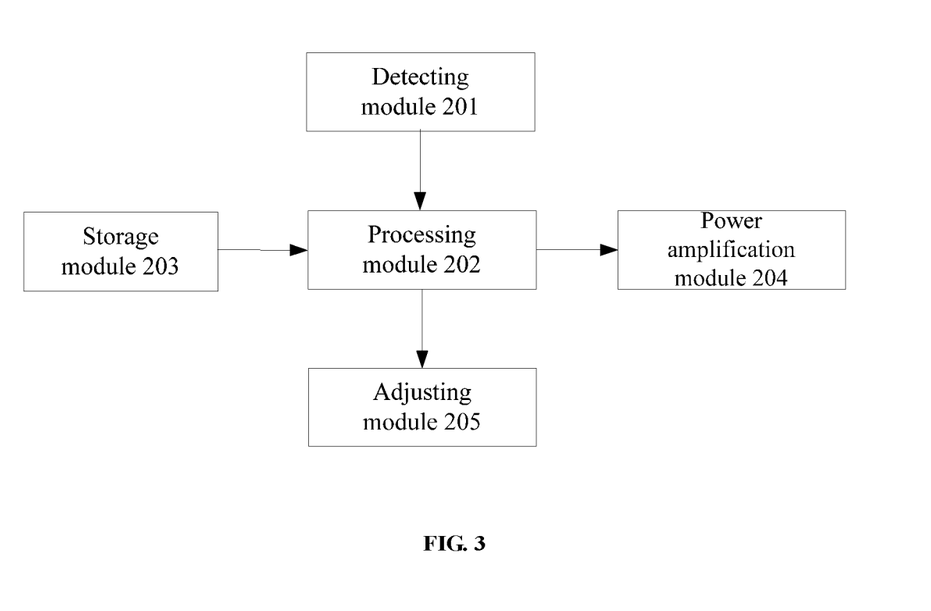
FIG. 3 is a schematic structural diagram of a multi-screen terminal according to a second embodiment of the present disclosure.

Specifically, as shown in FIG. 3, the multi-screen terminal further includes an adjusting module 205, wherein:

the processing module 202 is further configured to send a notification to the adjusting module 205 in case where the current opening/closing angle or angles between the respective display screens and/or the current audio drive parameters need to be adjusted; and the adjusting module 205 is configured to adjust, after receiving the notification from the processing module 202, the current opening/closing angle or angles between the respective display screens and/or the current audio drive parameters to the prestored opening/closing angle or angles and/or audio drive parameters corresponding to the optimal sound field playing effect; or give, on a currently used display screen through a user interface, a prompt as to how to adjust the current opening/closing angle or angles between the respective display screens and/or the current audio drive parameters to the prestored opening/closing angle or angles and/or audio drive parameters corresponding to the optimal sound field playing effect.

Optionally, the audio drive parameters include, but are not limited to, a filter parameter, a gain parameter and a phase parameter. The filter parameter is used for frequency-selection of different frequencies of sound signals for further processing (e.g., amplification, attenuation, rejection, etc.). The gain parameter is used for amplification or attenuation of the frequency-selected sound signal, and generally speaking, different gain parameters are adopted for sound signals of different frequency points. The phase parameter is used for phase shift processing of the sound signals to produce a stereo reverberation effect of the whole sound field so that the sound field could show more space sense and image sense.

It should be noted that the prestored correspondence relationships among the opening/closing angles, the sound field playing effects, and the audio drive parameters may be set before the multi-screen terminal leaves the factory. For example, by debugging and recording different sound field playing effects corresponding to different opening/closing angles and different audio drive parameters, several different opening/closing angles and audio drive parameters capable of obtaining the optimal sound field playing effect at each of the several opening/closing angles are selected as the prestored correspondence relationships among the opening/closing angles, the sound field playing effects, and the audio drive parameters.

Optionally, the processing module 202 selecting, according to the detected current opening/closing angle or angles between the respective display screens, a group of audio drive parameters prestored in the storage module 203, and outputting the group of audio drive parameters to the power amplification module 204 includes:

selecting audio drive parameters prestored in the storage module 203 corresponding to the detected current opening/closing angle or angles between the respective display screens, and outputting the selected audio drive parameters to the power amplification module 204; or, calculating similarity between the detected current opening/closing angle or angles between the respective display screens and the opening/closing angles between the respective display screens prestored in the storage module 203, and selecting the audio drive parameters corresponding to a prestored opening/closing angle or angles with the maximum similarity with the current opening/closing angle or angles, and outputting the audio drive parameters to the power amplification module 204.

Optionally, assuming that the prestored opening/closing angles between the respective display screens are arrays Al to An, where n is the number of sets of correspondence relationships among the prestored opening/closing angles between the respective display screens and the sound field playing effects, and the detected current opening/closing angle or angles between the respective display screens form an array B, the processing module 202 calculating similarity between the detected current opening/closing angle or angles between the respective display screens and the opening/closing angles between the respective display screens prestored in the storage module 203 includes:

calculating differences between corresponding array elements in the array B and in each of the arrays A1-An and calculating variance and/or weighted average of each group of differences; wherein the smaller the calculated variance and/or weighted average of the differences between the array elements in the array B and the array elements in an array Ai, the greater the similarity between the array B and the array Ai, where i is a natural number between 1 and n.

It should be noted that when calculating the variance and/or weighted average of each group of differences, weights of the respective elements in each array of elements are set in advance in the multi-screen terminal according to actual conditions, and when the weights of the respective elements are the same, the weighted average is the average; the smaller the obtained variance and/or weighted average, the greater the similarity.

In an embodiment of the present disclosure, assuming that the multi-screen terminal is a three-screen terminal, and the array Ai includes two array elements (ai0,ai1), where ai0 is an included angle between a first screen and a second screen, and ai1 is an included angle between the second screen and a third screen, where i is a natural number between 1 and n. Assuming that five sets of correspondence relationships between the opening/closing angles between the respective display screens and sound field playing effects are prestored, in which an array A1 of the opening/closing angles between the respective display screens is [90°, 90°], A2 is [30°, 90°], A3 is [90°, 30°], A4 is [60°, 30°], and A5 is [45°, 45°]. Assuming that the detected current opening/closing angles between the respective display screens form an array B, which is [85°, 95°], then:

firstly, the differences between corresponding array elements in the array B and the arrays A1 to A5 are respectively calculated, i.e., [−5°, 5°], [55°, 5°], [−5°, 60°], [25°, 45°] and [40°, 50°];

next, the average and variance of each group of differences are calculated, i.e., the first group of differences has an average $((-5)+5)/2=0$, and a variance $((-5-0)^2+(5-0)^2)/2=25$; the second group of differences has an average $(55+5)/2=30$, and a variance $((55-30)^2+(5-30)^2)/2=625$; the third group of differences has an average $((-5)+60)/2=27.5$, and a variance $((-5-27.5)^2+(60-27.5))/2=1056.25$; the fourth group of differences has an average $(25+45)/2=35$, and a variance $((25-35)^2+(45-35)^2)/2=100$; the fifth group of differences has an average $(40+50)/2=45$, and a variance $((40-45)^2+(50-45)^2)/2=25$. It can be seen from the calculation results that the first group of differences has the minimum average, and the first and fifth groups of differences have the minimum variance. Therefore, the current opening/closing angles between the respective display screens are considered to be most similar to the first group of prestored opening/closing angles between the respective display screens, and thus the audio drive parameters corresponding to the first group of opening/closing angles are output to the power amplification module 204 of the multi-screen terminal.

Optionally, the processing module 202 is specifically configured to select, according to the detected current opening/closing angle or angles between the respective display screens and a current sound field type, a group of audio drive parameters prestored in the storage module 203, and output the group of audio drive parameters to the power amplification module 204; or, determine whether the current opening/closing angle or angles between the respective display screens, the current audio drive parameters, and the current sound field type are opening/closing angle or angles, audio drive parameters and sound field type prestored in the storage module 203 corresponding to an optimal sound field playing effect, respectively, and if not, give a prompt as to whether the current opening/closing angle or angles between the respective display screens need to be adjusted, the current audio drive parameters and/or the current sound field type.

Optionally, the adjusting module 205 is specifically configured to adjust, after receiving the notification from the processing module 202, the current opening/closing angle or angles between the respective display screens, the current audio drive parameters and/or the current sound field type to the prestored opening/closing angle or angles, audio drive parameters and/or sound field type corresponding to the optimal sound field playing effect, or give, on a currently used display screen through a user interface, a prompt as to how to adjust the current opening/closing angle or angles between the respective display screens, the current audio drive parameters and/or the current sound field type to the prestored opening/closing angle or angles, audio drive parameters and/or sound field type corresponding to the optimal sound field playing effect.

For example, the sound field type may include various types such as soft, clear, heavy bass, and rock style. At this time, among the prestored correspondence relationships among the opening/closing angles, the sound field types, and the sound field playing effects, the same opening/closing angle(s) corresponds to multiple sets of audio drive parameters for obtaining a better sound field playing effect for different sound field types.

The following preferred embodiment describes how the method for playing sound and the multi-screen terminal of the present disclosure are applied. It should be noted that the preferred embodiment below is only for better describing the present disclosure and should not be construed as limit to the present disclosure.

Figure 4:
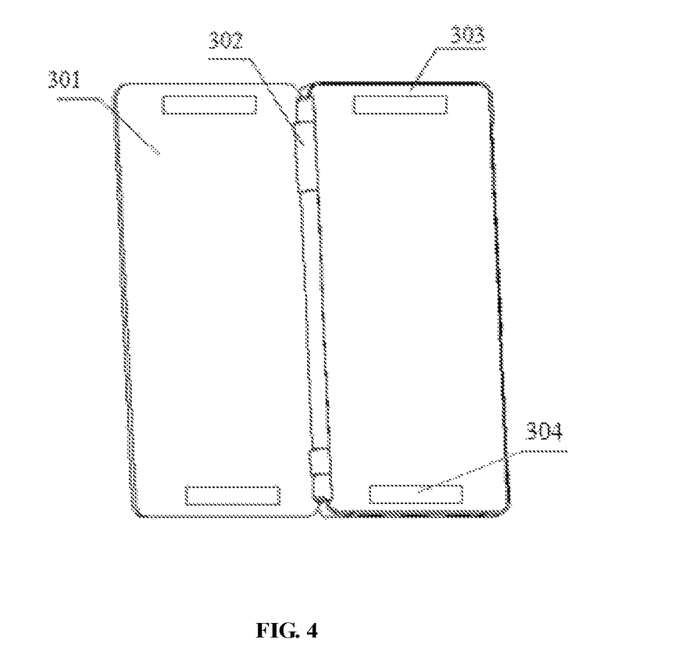
FIG. 4 is a schematic diagram illustrating an overall structure of a dual-screen mobile phone according to a preferred embodiment of the present disclosure.

As shown in FIG. 4, a dual-screen mobile terminal is foldable within a range of 0° to 180° in the left-right direction, in which screen 301 is defined as an auxiliary screen with two loudspeakers 304 provided thereon; screen 303 is defined as a main screen with two loudspeakers 304 provided thereon; and a connection means 302 is used for connecting various functions of the main screen and the auxiliary screen and is provided with a rotation shaft. The main screen and the auxiliary screen may be rotated manually by a user according to a prompt, or may be automatically rotated through a preset instruction.

Figure 5:
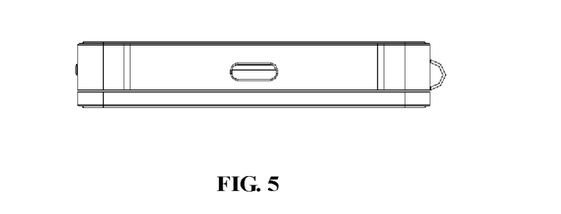
FIG. 5 is a schematic structural diagram of a dual-screen mobile phone with a folding angle of 0° according to a preferred embodiment of the present disclosure.
Figure 6:
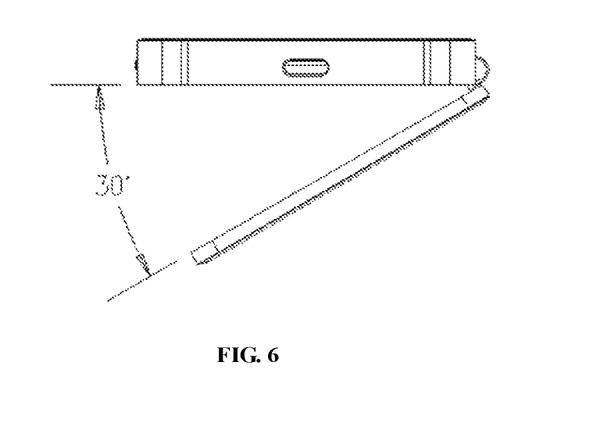
FIG. 6 is a schematic structural diagram of a dual-screen mobile phone with a folding angle of 30° according to a preferred embodiment of the present disclosure.
Figure 7:
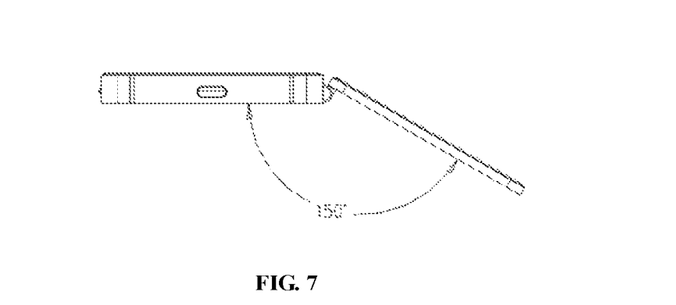
FIG. 7 is a schematic structural diagram of a dual-screen mobile phone with a folding angle of 150° according to a preferred embodiment of the present disclosure.
Figure 8:
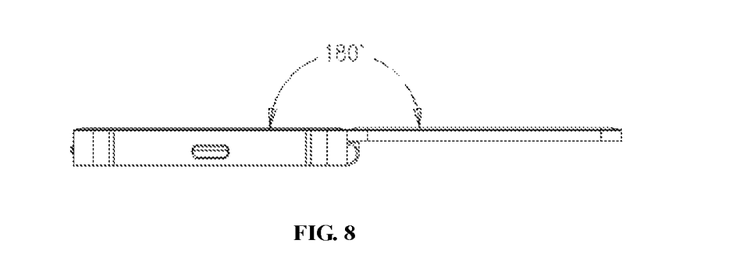
FIG. 8 is a schematic structural diagram of a dual-screen mobile phone with a folding angle of 180° according to a preferred embodiment of the present disclosure.

During debugging of the dual-screen mobile terminal, different sound field schemes are debugged according to commonly used different opening/closing angles, and four kinds of audio drive parameters suitable for four common opening/closing angles, 0°, 30°, 150°, 180° (the corresponding opening/closing angle in FIG. 5 is 0°, the corresponding opening/closing angle in FIG. 6 is 30°, the corresponding opening/closing angle in FIG. 7 is 150°, and the corresponding opening/closing angle in FIG. 8 is 180°) are debugged (tried) out, including filter parameters, gain parameters, phase parameters, and so on, thereby achieving better equalization and reverberation effects at each angle.

For example, for the opening/closing angle of 30° as shown in FIG. 6, the following are respectively debugged:

(1) Filter parameter and gain parameter: when the opening/closing angle is 30°, the four loudspeakers have an obvious opposite-direction effect, and if the prior art is used, every two opposite loudspeakers may have some cancellation to a certain extent, resulting in a poor sound effect. During the current debugging, a higher gain is made for different frequencies to control the sound field cancellation of opposite loudspeakers and a balancing effect is finally achieved.

(2) Phase parameter: when the opening/closing angle is 30°, the four loudspeakers have an obvious opposite-direction effect, and if the prior art is used, every two opposite loudspeakers may have some cancellation to a certain extent, resulting in a poor sound effect. During the current debugging, pre-broadcast signals of the opposite loudspeakers are shifted in phase with a large amplitude, thus the phases are staggered, and the cancellation is controlled, thereby achieving an effect of surrounding stereo reverberation.

The correspondence relationships between the four common opening/closing angles and audio drive parameters are prestored in the dual-screen mobile terminal.

In use, the terminal detects the opening/closing angle between the respective display screens through an angle detecting device. The angle detecting device may be an angle sensor, a hall sensor, or the like in the prior art, which is not limited herein.

Then, according to the opening/closing angle between the respective display screens, audio drive parameters corresponding to the opening/closing angle between the respective display screens having minimum differences with the prestored opening/closing angle between the respective display screens in the terminal are searched. Corresponding audio drive parameters are extracted and output to a power amplification module of the terminal so that the terminal is turned over between 0° and 180°, and an optimal sound field playing effect is obtained at different opening and closing angles.

Optionally, several optimal sound field schemes and corresponding opening/closing angles are prestored in the dual-screen mobile terminal, and when the current opening/closing angle of the dual-screen mobile terminal are not the opening/closing angle corresponding to the optimal sound field schemes, a prompt as to whether the opening/closing angle between the respective display screens to obtain a better sound field playing effect is given on the currently used display screen. If the user selects to adjust, the opening/closing angle between the display screens are automatically adjusted to the opening/closing angle for obtaining the optimal sound field playing effect, or the user is guided to adjust the opening/closing angle between the display screens to the opening/closing angle for obtaining the optimal sound field playing effect on the currently used display screen.

If the user selects to manually adjust the opening/closing angle between the display screens, on the currently used display screen, the user is graphically guided (including a turnover direction and a turnover target point) to turn over the terminal. The opening/closing angle between the respective display screens is detected in real time and displayed on the currently used display screen, and finally the user is guided to manually turn over the terminal to the optimal sound field angle. For example, if the current opening/closing angle is 120°, and the target is 30°, the user is graphically guided to turn over the terminal in a direction toward the 30° position, and the current opening/closing angle is displayed in real time until the user turns over the terminal to 30°, and then the user is indicated that the turnover is completed.

If the user selects to automatically adjust the opening/closing angle between the respective display screens, a difference between the current opening/closing angle and the target opening/closing angle is calculated, and a motor is controlled to automatically adjust the opening/closing angle between the respective display screens to finally reach an angle corresponding to the optimal sound field. For example, if the current opening/closing angle is 90°, and the target is 30°, the motor automatically adjusts the opening/closing angle between the respective display screens to 30°.

According to the method for playing sound and the multi-screen terminal of the present disclosure, by means of prestoring correspondence relationships among the opening/closing angles, the audio drive parameters and the sound field playing effects, the problem of sound field cancellation of multiple loudspeakers of a multi-screen terminal is solved, the audio effect of the multi-screen terminal is optimized, and the auditory experience of a user is thus improved.

The technical solutions of the present application are not limited to wired devices or wireless terminals, but may be an industrial control display terminal, a portable product or other vehicle-mounted visual devices, and are reliable and low in cost.

One of ordinary skill in the art will appreciate that all or part of the steps described above may be implemented by a program stored in a non-transitory computer readable medium for instructing the associated hardware, such as a read-only memory, a magnetic or optical disk, and the like. Optionally, all or part of the steps in the above embodiments may also be implemented by one or more integrated circuits. Accordingly, respective modules/units in the above embodiments may be implemented in the form of hardware, or in the form of a software function module. The present disclosure is not limited to any particular combination form of hardware and software.

The descriptions above are only preferred embodiments of the present disclosure, which are not used to restrict the present disclosure. For those skilled in the art, the present disclosure may have various changes and variations. Any amendments, equivalent substitutions, improvements, etc. within the principle of the present disclosure are all included in the scope of the protection defined by the appended claims of the present disclosure.

INDUSTRIAL APPLICABILITY

According to the method for playing sound and the multi-screen terminal of the present disclosure, by means of prestoring correspondence relationships among the opening/closing angles, the audio drive parameters and the sound field playing effects, the problem of sound field cancellation of multiple loudspeakers of a multi-screen terminal is solved, the audio effect of the multi-screen terminal is optimized, and the auditory experience of a user is thus improved.

What is claimed is:

1. A method for playing sound, comprising:
   detecting, by a multi-screen terminal, a current opening/closing angle or angles between the respective display screens; and
   selecting, by the multi-screen terminal according to the detected current opening/closing angle or angles between the respective display screens, a group of prestored audio drive parameters, and outputting the group of audio drive parameters to a power amplification module of the multi-screen terminal; or,
   determining whether the detected current opening/closing angle or angles between the respective display screens and the current audio drive parameters are prestored opening/closing angle or angles and audio drive parameters corresponding to an optimal sound field playing effect, respectively, and if not, giving a prompt as to whether the current opening/closing angle or angles between the respective display screens and/or the current audio drive parameters need to be adjusted;
   wherein the step of selecting, by the multi-screen terminal according to the detected current opening/closing angle or angles between the respective display screens, a group of prestored audio drive parameters, and outputting the group of audio drive parameters to the power amplification module of the multi-screen terminal comprises:
   selecting, by the multi-screen terminal, prestored audio drive parameters corresponding to the detected current opening/closing angle or angles between the respective display screens, and outputting the selected audio drive parameters to the power amplification module; or,
   calculating, by the multi-screen terminal, similarity between the detected current opening/closing angle or angles between the respective display screens and prestored opening/closing angles between the respective display screens, and selecting the audio drive parameters corresponding to a prestored opening/closing angle or angles with the maximum similarity with the current opening/closing angle or angles, and outputting the selected audio drive parameters to the power amplification module;
   wherein assuming that the prestored opening/closing angles between the respective display screens are arrays A1 to An, where n is the number of sets of correspondence relationships among the prestored opening/closing angles between the respective display screens and the sound field playing effects, and the detected current opening/closing angle or angles between the respective display screens form an array B, the step of calculating, by the multi-screen terminal, similarity between the detected current opening/closing angle or angles between the respective display screens and prestored opening/closing angles between the respective display screens comprises:
   calculating differences between corresponding array elements in the array B and in each of the arrays A1-An and variance and/or weighted average of each group of differences; wherein
   the smaller the calculated variance and/or weighted average of the differences between the array elements in the array B and the array elements in an array Ai, the greater the similarity between the array B and the array Ai, where i is a natural number between 1 and n.

2. The method for playing sound according to claim 1, wherein the method further comprises:
   adjusting by the multi-screen terminal, in case where the current opening/closing angle or angles between the respective display screens and/or the current audio drive parameters need to be adjusted, the current opening/closing angle or angles between the respective display screens and/or the current audio drive parameters to the prestored opening/closing angle or angles and/or audio drive parameters corresponding to the optimal sound field playing effect; or, giving, on a currently used display screen through a user interface, a prompt as to how to adjust the current opening/closing angle or angles between the respective display screens and/or the current audio drive parameters to the prestored opening/closing angle or angles and/or audio drive parameters corresponding to the optimal sound field playing effect.

3. The method for playing sound according to claim 1, wherein the audio drive parameters comprise a filter parameter, a gain parameter and a phase parameter.

4. A non-transitory computer readable medium comprising a program stored thereon, wherein the program, when executed, causes the method of claim 1 to be implemented.

5. A multi-screen terminal, comprising a detecting circuit, a processing circuit, a power amplification circuit and a storage circuit, wherein:
   the detecting circuit is configured to detect a current opening/closing angle or angles between the respective display screens, and output the detected current opening/closing angle or angles between the respective display screens to the processing circuit;
   the processing circuit is configured to select, according to the detected current opening/closing angle or angles between the respective display screens, a group of audio drive parameters prestored in the storage circuit, and output the group of audio drive parameters to the power amplification circuit; or, determine whether the detected current opening/closing angle or angles between the respective display screens and the current audio drive parameters are opening/closing angle or angles and audio drive parameters prestored in the storage circuit corresponding to an optimal sound field playing effect, respectively, and if not, give a prompt as to whether the current opening/closing angle or angles between the respective display screens and/or the current audio drive parameters need to be adjusted;
   the power amplification circuit is configured to output an audio according to the audio drive parameters; and
   the storage circuit is configured to prestore at least one set of correspondence relationships among the opening/closing angles between the respective display screens, the sound field playing effects and the audio drive parameters;
   wherein the processing circuit selecting, according to the detected current opening/closing angle or angles between the respective display screens, a group of audio drive parameters prestored in the storage circuit, and outputting the group of audio drive parameters to the power amplification circuit comprises:

selecting audio drive parameters prestored in the storage circuit corresponding to the detected current opening/closing angle or angles between the respective display screens, and outputting the selected audio drive parameters to the power amplification circuit; or, calculating similarity between the detected current opening/closing angle or angles between the respective display screens and the opening/closing angles between the respective display screens prestored in the storage circuit, and selecting the audio drive parameters corresponding to a prestored opening/closing angle or angles with the maximum similarity with the current opening/closing angle or angles, and outputting the audio drive parameters to the power amplification circuit:

wherein assuming that the prestored opening/closing angles between the respective display screens are arrays A1 to An, where n is the number of sets of correspondence relationships among the prestored opening/closing angles between the respective display screens and the sound field playing effects, and the detected current opening/closing angle or angles between the respective display screens form an array B, the processing circuit calculating similarity between the detected current opening/closing angle or angles between the respective display screens and the opening/closing angles between the respective display screens prestored in the storage circuit comprises:

calculating differences between corresponding array elements in the array B and in each of the arrays A1-An and variance and/or weighted average of each group of differences; wherein the smaller the variance and/or weighted average calculated from the array B and an array Ai, the greater the similarity of the array B and the array Ai, where i is a natural number between 1 and n.

6. The multi-screen terminal according to claim 5, further comprising an adjusting circuit, wherein the processing circuit is further configured to send a notification to the adjusting circuit in case where the current opening/closing angle or angles between the respective display screens and/or the current audio drive parameters need to be adjusted; and the adjusting circuit is configured to adjust, after receiving the notification from the processing circuit, the current opening/closing angle or angles between the respective display screens and/or the current audio drive parameters to the prestored opening/closing angle or angles and/or audio drive parameters corresponding to the optimal sound field playing effect; or give, on a currently used display screen through a user interface, a prompt as to how to adjust the current opening/closing angle or angles between the respective display screens and/or the current audio drive parameters to the prestored opening/closing angle or angles and/or audio drive parameters corresponding to the optimal sound field playing effect.

7. The multi-screen terminal according to claim 5, wherein the audio drive parameters comprise a filter parameter, a gain parameter and a phase parameter.

8. The multi-screen terminal according to claim 5, wherein the detecting circuit comprises a mechanical goniometer, a magnetic goniometer or a laser goniometer.

9. The multi-screen terminal according to claim 5, wherein the processing circuit is configured to select, according to the detected current opening/closing angle or angles between the respective display screens and a current sound field type, a group of audio drive parameters prestored in the storage circuit, and output the group of audio drive parameters to the power amplification circuit; or, determine whether the current opening/closing angle or angles between the respective display screens, the current audio drive parameters, and the current sound field type are an opening/closing angle or angles, audio drive parameters and sound field type prestored in the storage circuit corresponding to an optimal sound field playing effect, respectively, and if not, give a prompt as to whether the current opening/closing angle or angles between the respective display screens, the current audio drive parameters and/or the current sound field type need to be adjusted.

\* \* \* \* \*

UNITED STATES PATENT AND TRADEMARK OFFICE
CERTIFICATE OF CORRECTION

PATENT NO. : 11,115,515 B2  
APPLICATION NO. : 16/633195  
DATED : September 7, 2021  
INVENTOR(S) : Fengpeng Liu and Dongmei Liu Page 1 of 1

It is certified that error appears in the above-identified patent and that said Letters Patent is hereby corrected as shown below:

On the Title Page

The Left Column, Item (73), under "Assignee" reads:  
"XI'AN ZHONGXING NEW SOFTWARE CO. LTD, Xi'an (CN)"

Should read:  
"XI'AN ZHONGXING NEW SOFTWARE CO., LTD., Xi'an (CN)"

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*